United States Patent
Tang

(10) Patent No.: US 7,971,110 B2
(45) Date of Patent: Jun. 28, 2011

(54) SYSTEM AND METHOD FOR TESTING A SERIAL ATTACHED SMALL COMPUTER SYSTEM INTERFACE

(75) Inventor: Chiang-Chung Tang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/566,801

(22) Filed: Sep. 25, 2009

(65) Prior Publication Data

US 2010/0218043 A1    Aug. 26, 2010

(30) Foreign Application Priority Data

Feb. 26, 2009    (CN) .......................... 2009 1 0300588

(51) Int. Cl.
G01R 31/28    (2006.01)
(52) U.S. Cl. .......................... 714/716; 714/25
(58) Field of Classification Search .................. 370/248; 360/69; 711/203; 714/33, 44, 716, 25
See application file for complete search history.

(56) References Cited

U.S. PATENT DOCUMENTS

| | | | |
|---|---|---|---|
| 7,210,065 B2 * | 4/2007 | Uddenberg et al. | 714/33 |
| 7,272,114 B1 * | 9/2007 | Barkan | 370/248 |
| 7,280,302 B1 * | 10/2007 | Masiewicz | 360/69 |
| 7,519,004 B1 * | 4/2009 | Kamity et al. | 370/248 |
| 7,701,861 B1 * | 4/2010 | Barkan | 370/248 |
| 2004/0117588 A1 * | 6/2004 | Arimilli et al. | 711/203 |

* cited by examiner

*Primary Examiner* — David Ton
(74) *Attorney, Agent, or Firm* — Raymond J. Chew

(57) ABSTRACT

In a system and method for testing a serial attached small computer systems (SAS) interface of a SAS controller, the SAS controller connects to a loopback dongle via the SAS interface. The SAS interface sends a first data packet to the loopback dongle, and receives a second data packet from the loopback dongle. If information in the second data packet is the same as information in the first data packet, the system and method transmits a first notification indicating that the SAS interface is functioning normally. Otherwise, the system and method transmits a second notification indicating that the SAS interface is not functioning normally.

12 Claims, 4 Drawing Sheets

SYSTEM AND METHOD FOR TESTING A SERIAL ATTACHED SMALL COMPUTER SYSTEM INTERFACE

BACKGROUND

1. Technical Field

Embodiments of the present disclosure relate to testing systems and methods, and more particularly to a system and method for testing a serial attached small computer system (SAS) interface.

2. Description of Related Art

At present, one example of a system to test a serial attached small computer system (SAS) interface of a SAS controller, is as shown in FIG. 1. The system comprises the SAS controller connecting to at least one SAS device, so as to respond to a testing command sent from the SAS controller. Since the SAS device, such as a SAS expander, is very expensive, cost of testing the SAS interface of the SAS controller can be high.

Therefore, an effective system and method is needed to overcome the described limitations.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
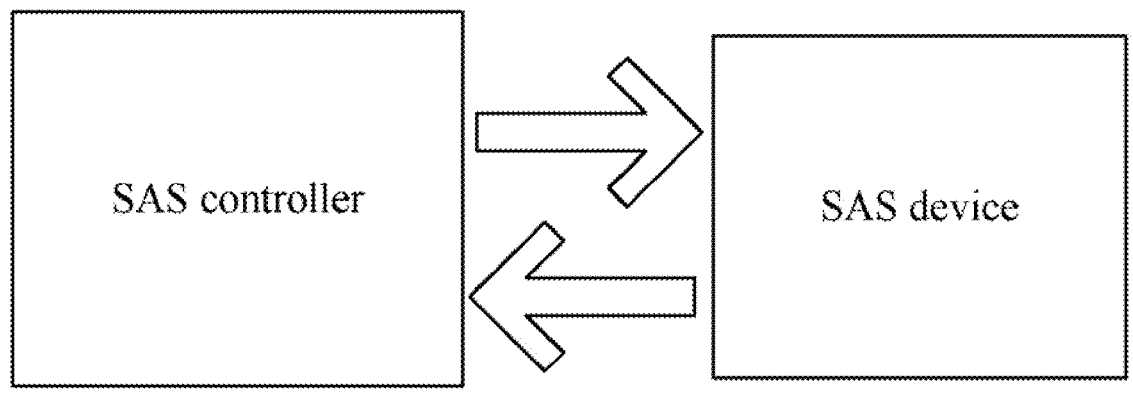
FIG. 1 is a block diagram of a commonly used system for testing a serial attached small computer system (SAS) interface of a SAS controller.
Figure 2:
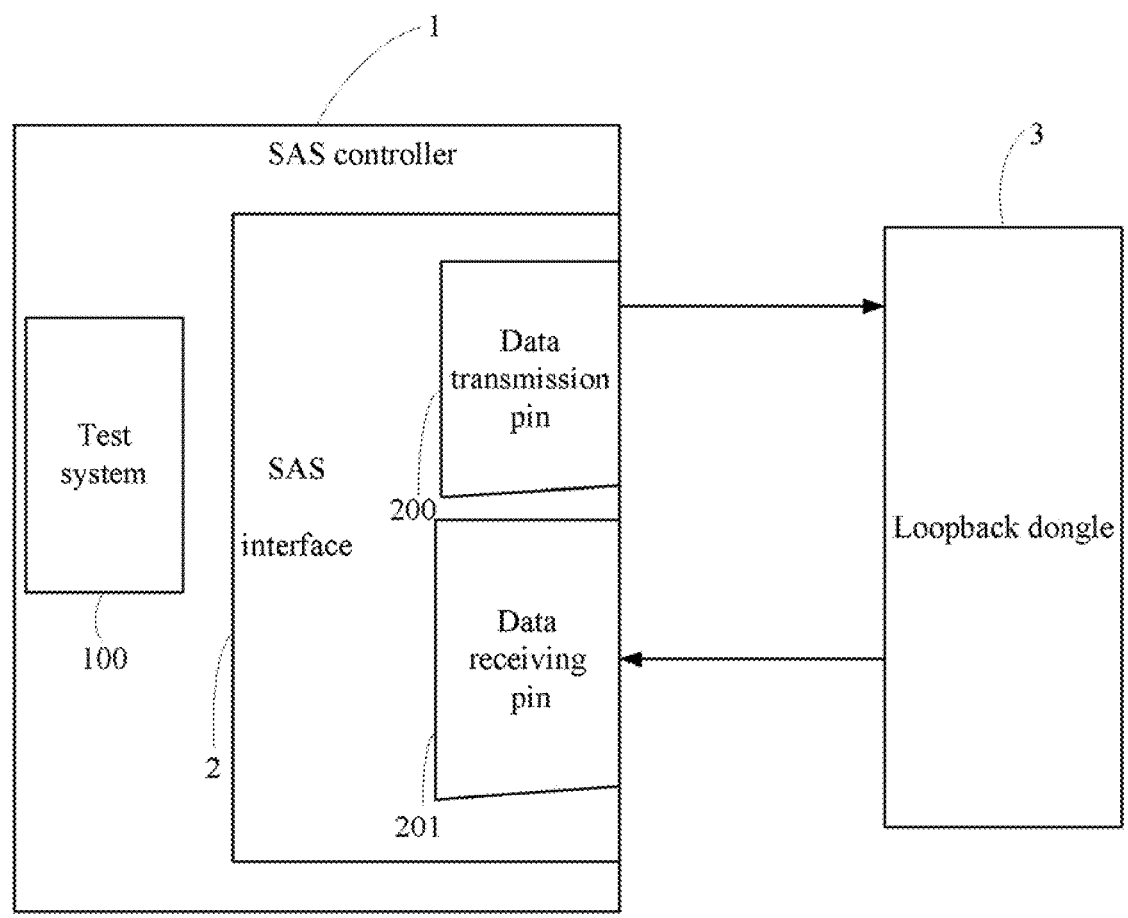
FIG. 2 is a block diagram of one embodiment of a system for testing a SAS interface of a SAS controller.

FIG. 2 is a block diagram of one embodiment of a serial attached small computer systems (SAS) controller 1 comprising a test system 100. The testing system 100 may be used to test one or more SAS interfaces 2 (only one is shown in FIG. 1) of the SAS controller 1. A SAS interface 2 includes a data transmission pin 200 and a data receiving pin 201. The data transmission pin 200 and the data receiving pin 201 are connected with a loopback dongle 3. The loopback dongle 3 communicates with the SAS controller 1 via the data transmission pin 200 and the data receiving pin 201. The loopback dongle 3 may be used to receive a data packet from the SAS controller which is then returned to the SAS controller.

Figure 3:
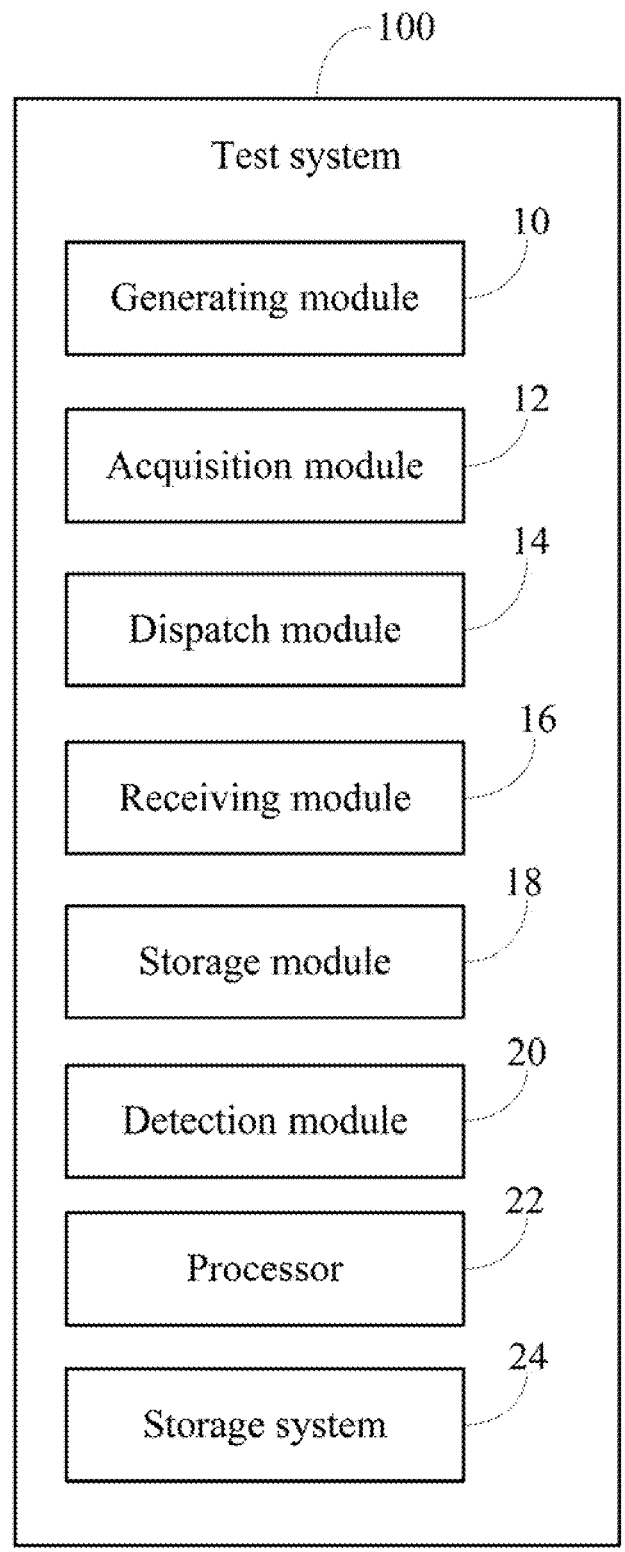
FIG. 3 is a block diagram of functional modules of the test system in FIG. 1.

FIG. 3 is a block diagram of one embodiment of functional modules of the test system 100 in FIG. 1. In one embodiment, the test system 10 may include a generating module 10, an acquisition module 12, a dispatch module 14, a receiving module 16, a storage module 18, and a detection module 20. It may be understood that one or more specialized or general purpose processors, such as a processor 22, may be used to execute one or more computerized codes of the functional modules 10-20. The one or more computerized codes of the functional modules 10-20 may be stored in a storage system 24. The storage system 24 also stores attributes of all the SAS interfaces 2 of the SAS controller 1. In one embodiment, the attributes of each SAS interface 2 may include an identifier (ID) of the SAS interface 2.

The generating module 10 generates virtual memory in the SAS controller 1 for storing data, including data packets to be sent to the loopback dongle 3 and data packets returned from the loopback dongle 3.

The acquisition module 12 obtains an attribute of a SAS interface 2 to be tested from the storage system 24.

The dispatch module 14 sends a first data packet to the loopback dongle 3 via the data transmission pin 200 of the test SAS interface 2 using a transmission protocol of the test SAS interface 2. Information contained in the first data packet may include test data, the attribute of the SAS interface 2 to be tested, and the transmission protocol of the SAS interface 2.

The receiving module 16 receives a second data packet sent by the loopback dongle 3 via the data transmission pin 201 of the test SAS interface 2.

The storage module 18 stores the received second data packet in the virtual memory using the transmission protocol of the test SAS interface 2.

The detection module 20 determines if information contained in the second data packet is the same as information contained in the first data packet. In one embodiment, the detection module 20 may compare the test data of the attribute in the first data packet with test data of an attribute in the second data packet. If the information contained in the second data packet is the same as that in the first data packet, the detection module 20 transmits a first notification indicating that the SAS interface 2 is functioning normally. If the information contained in the second data packet is different from that contained in the first data packet, the detection module 20 transmits a second notification indicating that the test SAS interface 2 is not functioning normally.

Figure 4:
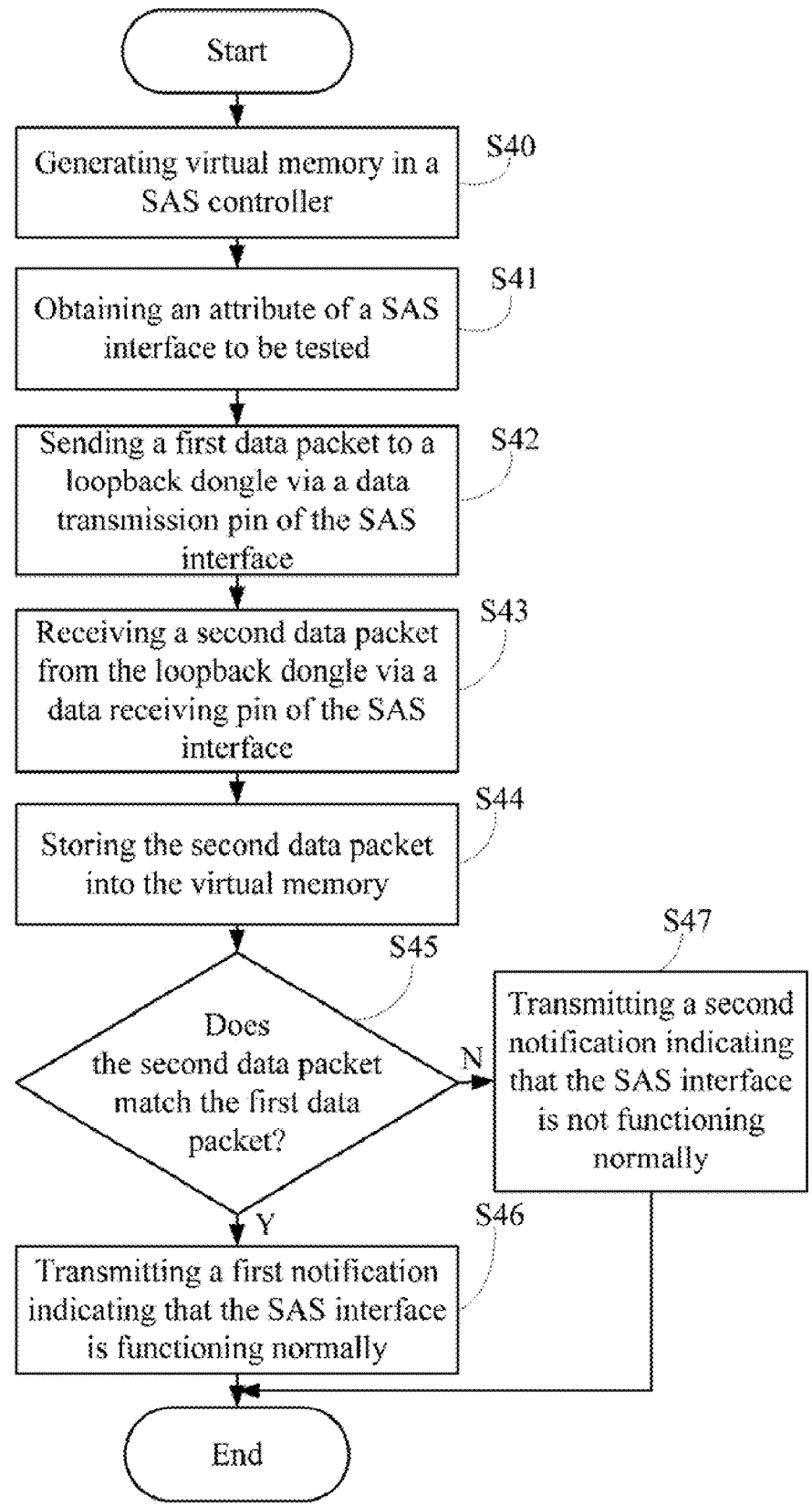
FIG. 4 is a flowchart of one embodiment of a method for testing a SAS interface of the SAS controller, employed in a system such as, for example, that of FIG. 1.

FIG. 4 is a flowchart of one embodiment of a method for testing a SAS interface of the SAS controller, employed in a system such as, for example, that of FIG. 1. Depending on the embodiment, additional blocks may be added, others removed, and the ordering of the blocks may be changed.

In block S40, the generating module 10 generates virtual memory in the SAS controller 1 for storing data packets. Information contained in each data packet may include test data, the attribute of the SAS interface 2 to be tested, and the transmission protocol of the SAS interface 2.

In block S41, the acquisition module 12 obtains an attribute of a SAS interface 2 to be tested from the storage system 24.

In block S42, the dispatch module 14 sends a first data packet to the loopback dongle 3 via the data transmission pin 200 using a transmission protocol.

In block S43, the receiving module 16 receives a second data packet sent from the loopback dongle 3 via the data receiving pin 201 of the SAS interface 2.

In block S44, the storage module 18 stores the received second data packet into the virtual memory.

In block S45, the detection module 20 determines if the second data packet matches the first data packet. In one embodiment, if information contained in the second data packed is the same as information contained in the first data packet, the second data packet matches the first data packet. If the information contained in the second data packet is different from the information contained in the first data packet, the second data packet does not match the first data packet. If the second data packet matches the first data packet, block S46 is implemented. If the second data packet does not match the first data packet, block S47 is implemented.

In block S46, the detection module 20 transmits notification that the test SAS interface 2 is functioning normally. In block S47, the detection module 20 transmits notification that the test SAS interface is not functioning normally.

The above embodiments provide a loopback dongle 3 rather than a SAS device as is often used. The loopback dongle 3 receives the first data packet from the test SAS interface 2. The SAS interface 2 receives a second data packet from the loopback dongle 3. If the second data packet matches the first data packet, the test system 100 transmits a first notification indicating that the test SAS interface 2 is functioning normally. If the second data packet does not match the first data packet, the test system 100 transmits a second notification indicating that the test SAS interface is not functioning normally.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for testing a serial attached small computer systems (SAS) interface of a SAS controller, the system comprising:
   at least one processor to execute one or more programs stored in a storage system of the SAS controller, the one or more programs comprising:
   a dispatch module to send a first data packet to a loopback dongle connected to the SAS controller via a data transmission pin of the SAS interface, information in the first data packet comprising test data and attributes of the SAS interface;
   a receiving module to receive a second data packet sent by the loopback dongle via a data receiving pin of the SAS interface; and
   a detection module to determine if information in the second data packet is the same as the information in the first data packet, issue a first notification indicating that the SAS interface is functioning normally if the information in the second data packet is the same as the information in the first data packet, and issue a second notification indicating that the SAS interface is not functioning normally if the information in the second data packet is different from the information in the first data packet.

2. The system of claim 1, further comprising: a generating module to generate virtual memory in the SAS controller for storing the data packets.

3. The system of claim 2, further comprising: a storage module to store the received second data packet into the virtual memory.

4. The system of claim 1, wherein the information in the first data packets further comprises a transmission protocol of the SAS interface.

5. A method for testing a serial attached small computer systems (SAS) interface of a SAS controller, the method comprising:
   (a) sending a first data packet to a loopback dongle connected to the SAS controller via a data transmission pin of the SAS interface, information in the first data packet comprising test data and attributes of the SAS interface;
   (b) receiving a second data packet sent by the loopback dongle via a data receiving pin of the SAS interface;
   (c) determining if information in the second data packet is the same as the information in the first data packet;
   (d) transmitting a first notification indicating that the SAS interface is functioning normally if the information in the second data packet is the same as information in the first data packet; and
   (e) transmitting a second notification indicating that the SAS interface is not functioning normally if the information in the second data packet is different from the information in the first data packet.

6. The method of claim 5, further comprising, before any packets are sent, generating virtual memory in the SAS controller for storing the data packets.

7. The method of claim 6, further comprising storing received second data packets in the virtual memory.

8. The method of claim 5, wherein the information in the first data packets further comprises a transmission protocol of the SAS interface.

9. A computer-readable medium having stored therein instructions that, when executed by a serial attached small computer systems (SAS) controller, cause the SAS controller to perform a method for testing a SAS, the method comprising:
   (a) sending a first data packet to a loopback dongle connected to the SAS controller via a data transmission pin of the SAS interface, information in the first data packet comprising test data and attributes of the SAS interface;
   (b) receiving a second data packet sent by the loopback dongle via a data receiving pin of the SAS interface;
   (c) determining if information in the second data packet is the same as the information in the first data packet;
   (d) transmitting a first notification indicating that the SAS interface is functioning normally if the information in the second data packet is the same as information in the first data packet; and
   (e) transmitting a second notification indicating that the SAS interface is not functioning normally if the information in the second data packet is different from the information in the first data packet.

10. The medium of claim 9, further comprising, before any packets are sent, generating virtual memory in the SAS controller for storing data packets.

11. The medium of claim 10, further comprising: storing received second data packets in the virtual memory.

12. The medium of claim 9, wherein the information in the first data packets further comprises a transmission protocol of the SAS interface.

* * * * *